United States Patent
Wu et al.

(10) Patent No.: US 12,490,083 B2
(45) Date of Patent: Dec. 2, 2025

(54) INFORMATION TRANSMISSION METHOD, BASE STATION, TERMINAL, AND COMMUNICATION SYSTEM

(71) Applicant: CHINA TELECOM CORPORATION LIMITED, Beijing (CN)

(72) Inventors: Jingzhou Wu, Beijing (CN); Shan Yang, Beijing (CN); Xiaoming She, Beijing (CN); Peng Chen, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 168 days.

(21) Appl. No.: 18/284,492

(22) PCT Filed: Nov. 26, 2021

(86) PCT No.: PCT/CN2021/133548
§ 371 (c)(1),
(2) Date: Sep. 27, 2023

(87) PCT Pub. No.: WO2022/205969
PCT Pub. Date: Oct. 6, 2022

(65) Prior Publication Data
US 2024/0196198 A1    Jun. 13, 2024

(30) Foreign Application Priority Data
Mar. 30, 2021  (CN) .......................... 202110339566.7

(51) Int. Cl.
*H04W 8/24*      (2009.01)
*H04L 5/00*      (2006.01)
*H04W 24/02*     (2009.01)

(52) U.S. Cl.
CPC ............ *H04W 8/24* (2013.01); *H04L 5/0051* (2013.01); *H04W 24/02* (2013.01)

(58) Field of Classification Search
None
See application file for complete search history.

(56) References Cited

U.S. PATENT DOCUMENTS

| | | |
|---|---|---|
| 2015/0009794 A1 | 1/2015 | Damnjanovic et al. |
| 2018/0287760 A1 | 10/2018 | Choi et al. |

(Continued)

FOREIGN PATENT DOCUMENTS

| | | |
|---|---|---|
| CN | 102907157 A | 1/2013 |
| CN | 103581073 A | 2/2014 |

(Continued)

OTHER PUBLICATIONS

International Search Report and Written Opinion issued on Jan. 26, 2022 in corresponding Application No. PCT/CN2021/133548; 8 pages.

(Continued)

*Primary Examiner* — Faruk Hamza
*Assistant Examiner* — Cassandra L Decker
(74) *Attorney, Agent, or Firm* — Andrew M. Calderon; Calderon Safran & Wright P.C.

(57) ABSTRACT

The present invention relates to the field of mobile communications, and provides an information transmission method, a base station, a terminal, and a communication system. In the present invention, an NR terminal reports LTE neighboring cell CRS interference inhibition capability information of the NR terminal to an NR base station, and the NR base station receives the LTE neighboring cell CRS interference inhibition capability information reported by the NR terminal.

20 Claims, 2 Drawing Sheets

(56) References Cited

U.S. PATENT DOCUMENTS

| | | | |
|---|---|---|---|
| 2019/0281475 A1 | 9/2019 | Damnjanovic et al. | |
| 2020/0112853 A1 | 4/2020 | Jiang et al. | |
| 2020/0275522 A1 | 8/2020 | Chervyakov et al. | |
| 2021/0099859 A1 | 4/2021 | Jiang et al. | |
| 2022/0182844 A1* | 6/2022 | Park | H04W 4/06 |

FOREIGN PATENT DOCUMENTS

| | | | | |
|---|---|---|---|---|
| CN | 108934005 A | | 12/2018 | |
| CN | 110602008 A | | 12/2019 | |
| CN | 111526591 A | | 8/2020 | |
| CN | 111819897 A | | 10/2020 | |
| CN | 112004232 A | | 11/2020 | |
| KR | 2022-0080654 A | * | 6/2022 | H04J 11/00 |
| WO | WO-2021017995 A1 | * | 2/2021 | H04L 5/0053 |
| WO | 2022047747 A1 | | 3/2022 | |

OTHER PUBLICATIONS

China Office Action dated Oct. 16, 2024 in CN Application No. 2023-560603 with English Translation, 12 pages.

Anonymous, "3rd Generation Partnership Project;Technical Specification Group Radio Access Network; Evolved Universal Terrestrial Radio Access (E-UTRA); Radio Resource Control (RRC); Protocol specification (Release 13)", 3GPP TS 36.331 V13.17.0 Dec. 2020, 653 Pages.

Huawei, HiSilicon, "UE behaviour for CRS-IC", 3GPP TSG-RAN WG4 Meeting #75 R4-152588 Fukuoka, Japan, May 25-29, 2015, 3 Pages.

Intel Corporation, "Enhanced CRS-IM UE capabilities and network assistance framework", 3GPP TSG-RAN WG4 Meeting #83 R4-1704635 Hangzhou, China, May 15-19, 2017, 5 Pages.

Intel Corporation, "Network-based CRS mitigation impact on UE demodulation", 3GPP TSG-RAN WG4 Meeting #86 R4-1801754 Athens, Greece, Feb. 26-Mar. 2, 2018, 3 Pages.

China Office Action dated Jul. 15, 2024 in CN Application No. 202110339566.7, with English Translation, 14 pages.

Intel Corporation, "Scope update for Rel-17 NR demodulation performance WI: CRS-IM for LTE/NR DSS", 3GPP TSG-RAN Meeting #90-e RP-202659 E-meeting, Dec. 7-11, 2020, 5 Pages.

ZTE, "Discussion on NR demodulation requirement in LTE-NR coexistence scenario", 3GPP TSG-RAN WG4 Meeting #98-e Electronic Meeting, Jan. 25-Feb. 5, 2021, 3 Pages.

Ericsson, "Consideration on the UE CRS-IM capability", 3GPP TSG-RAN WG4 #79 Nanjing, China, R4-163930 May 23-27, 2016, 2 Pages.

Ericsson, "Performance analysis for legacy advanced receiver under Network-based CRS-mitigation", 3GPP TSG-RAN WG4 #84 R4-1708075 Berlin, Germany, Aug. 21-25, 2017, 13 Pages.

Intel Corporation, "CRS-IC for LTE-NR coexistence scenarios", 3GPP TSG-RAN WG4 Meeting #97-e E-meeting R4-2016002, Nov. 2-13, 2020, 4 Pages.

The Extended European Search Report and Opinion dated Jul. 23, 2024 in EP Application No. 21934605.3-1206 / 4307737 PCT/CN2021133548, 15 pages.

Decision to Grant a Patent issued Feb. 26, 2025 in JP Application No. 2023-560603, 6 pages.

China Telecom, "Discussion on the necessity of network assistance signalling for CRS-IM", 3GPP TSG-RAN WG4 Meeting #101-bis-e R4-2200899 Electronic Meeting, Jan. 17-25, 2022. 7 Pages.

* cited by examiner

10

```
┌─────────────────────────────────────────────────────────────────┐
│   110a: an NR terminal reports, to an NR base station, LTE      │
│      neighbor cell CRS interference mitigation capability       │
│               information of the NR terminal                    │
└─────────────────────────────────────────────────────────────────┘
                                 │
                                 ▼
┌─────────────────────────────────────────────────────────────────┐
│   110b: the NR base station receives the LTE neighbor cell CRS  │
│  interference mitigation capability information reported by the │
│                         NR terminal                             │
└─────────────────────────────────────────────────────────────────┘
                                 │
                                 ▼
┌─────────────────────────────────────────────────────────────────┐
│   120a: the NR base station sends the indication information    │
│ related to the LTE neighbor cell CRS interference mitigation to │
│           the NR terminal through RRC signaling                 │
└─────────────────────────────────────────────────────────────────┘
                                 │
                                 ▼
┌─────────────────────────────────────────────────────────────────┐
│   120b: the NR terminal receives the indication information     │
│  related to the LTE neighbor cell CRS interference mitigation   │
│  that is sent by the NR base station through the RRC signaling  │
└─────────────────────────────────────────────────────────────────┘
                                 │
                                 ▼
┌─────────────────────────────────────────────────────────────────┐
│ 130: the NR terminal performs interference mitigation according │
│               to the indication information                     │
└─────────────────────────────────────────────────────────────────┘
```

INFORMATION TRANSMISSION METHOD, BASE STATION, TERMINAL, AND COMMUNICATION SYSTEM

CROSS-REFERENCE TO RELATED APPLICATIONS

The present application is a U.S. National Stage Application under 35 U.S.C. 371 of International Patent Application No. PCT/CN2021/133548, filed on Nov. 26, 2021, which is based on and claims the priority to the Chinese Patent Application No. 202110339566.7 filed on Mar. 30, 2021, the disclosure of which are incorporated by reference herein in its entirety.

TECHNICAL FIELD

The present disclosure relates to the field of mobile communications, and in particular, to an information transmission method, a base station, a terminal, and a communication system.

BACKGROUND

A dynamic spectrum sharing (DSS) technique between 4G ($4^{th}$, 4th Generation) LTE (Long Term Evolution) and 5G ($5^{th}$, 5th Generation) NR (New Radio) is that a same spectrum is shared by an LTE terminal and an NR terminal, and resources are dynamically allocated by a network side to the terminals according to conditions such as network load, for 4G or 5G transmission.

For an neighbor cell 4G LTE system operating in the DSS mode, its downlink cell reference signal (CRS) which is normally open and occupies fixed resources will cause great interference to reception of an NR terminal using 5G in this cell.

For an NR terminal that supports a capability related to neighbor cell interference elimination, when an LTE neighbor cell schedules downlink data transmission on time-frequency resources of channel quality measurement reference signal (namely, CSI-RS (Channel State Information Reference Signal)) of an NR cell, the terminal can, through measurement, estimation, and equalization algorithms for CSI-RS, report channel quality information based on inter-ference mitigation to an NR base station, wherein the information contains suppression of neighbor cell interference including CRS interference, the scheduling of the NR base station based on the channel quality information at this time is matched with actual transmission quality.

However, if the LTE neighbor cell does not allocate the downlink data transmission on the NR channel quality measurement reference signal, channel quality detection of the NR terminal on a wireless channel does not include the neighbor cell CRS interference, that is, the channel quality information reported by the NR terminal to the base station at this time cannot reflect reception quality of the NR terminal under the CRS interference, resulting in a decrease in accuracy of operations such as resource allocation and scheduling performed by the base station.

SUMMARY

Some embodiments of the present disclosure provide an information transmission method, comprising: reporting, by a New Radio NR terminal to an NR base station, Long Term Evolution LTE neighbor cell Cell Reference Signal CRS interference mitigation capability information of the NR terminal.

In some embodiments, the NR terminal receives indication information related to LTE neighbor cell CRS interference mitigation that is sent by the NR base station through Radio Resource Control RRC signaling, wherein the indication information comprises at least one of enabling control information for the LTE neighbor cell CRS interference mitigation or LTE neighbor cell CRS information.

In some embodiments, the NR terminal performs interference mitigation according to the indication information.

In some embodiments, the NR terminal performing interference mitigation according to the indication information comprises:
  if the indication information comprises the enabling control information for the LTE neighbor cell CRS interference mitigation, the NR terminal turning on or off the LTE neighbor cell CRS interference mitigation according to the enabling control information for the LTE neighbor cell CRS interference mitigation; and
  if the indication information comprises the LTE neighbor cell CRS information, the NR terminal turning on the LTE neighbor cell CRS interference mitigation according to the LTE neighbor cell CRS information, and performing interference detection at a position corresponding to the LTE neighbor cell CRS information.

Some embodiments of the present disclosure provide an information transmission method, comprising: receiving, by an NR base station, LTE neighbor cell CRS interference mitigation capability information reported by an NR terminal.

In some embodiments, the NR base station sends indication information related to LTE neighbor cell CRS interference mitigation to the NR terminal through RRC signaling, wherein the indication information comprises at least one of enabling control information for the LTE neighbor cell CRS interference mitigation or LTE neighbor cell CRS information.

In some embodiments, the NR base station sends, to the NR terminal, the indication information related to the LTE neighbor cell CRS interference mitigation, according to the LTE neighbor cell CRS interference mitigation capability information of the NR terminal and LTE neighbor cell information of an NR cell where the NR terminal is currently located.

In some embodiments, the sending, by the NR base station to the NR terminal, the indication information related to the LTE neighbor cell CRS interference mitigation, according to the LTE neighbor cell CRS interference mitigation capability information of the NR terminal and LTE neighbor cell information of an NR cell where the NR terminal is currently located comprises:
  the NR base station sending, to the NR terminal, enabling control information for turning on the LTE neighbor cell CRS interference mitigation and/or the LTE neighbor cell CRS information when it is determined that the NR terminal supports the LTE neighbor cell CRS interference mitigation, and the LTE neighbor cell has CRS interference to the NR cell where the NR terminal is currently located according to the LTE neighbor cell CRS interference mitigation capability information of the NR terminal and the LTE neighbor cell information of the NR cell where the NR terminal is currently located; or
  the NR base station sending, to the NR terminal, enabling control information for turning off the LTE neighbor cell CRS interference mitigation according to the LTE neighbor cell CRS interference mitigation capability information of the NR terminal and the LTE neighbor cell information of the NR cell where the NR terminal is currently located; or the NR base station sending, to the NR terminal, the enabling control information for turning off the LTE neighbor cell CRS interference mitigation when it is determined that the NR terminal supports the LTE neighbor cell CRS interference mitigation and the LTE neighbor cell has no CRS interference to the NR cell where the NR terminal is currently located according to the LTE neighbor cell CRS interference mitigation capability information of the NR terminal and the LTE neighbor cell information of the NR cell where the NR terminal is currently located; or the NR base station sending, to the NR terminal, the enabling control information for turning on the LTE neighbor cell CRS interference mitigation and/or the LTE neighbor cell CRS information when it is determined that the NR terminal supports blind detection-based LTE neighbor cell CRS interference mitigation and the LTE neighbor cell has the CRS interference to the NR cell where the NR terminal is currently located according to the LTE neighbor cell CRS interference mitigation capability information of the NR terminal and the LTE neighbor cell information of the NR cell where the NR terminal is currently located; or the NR base station sending, to the NR terminal, the LTE neighbor cell CRS information when it is determined that the NR terminal supports the LTE neighbor cell CRS interference mitigation and does not support blind detection-based LTE neighbor cell CRS interference mitigation and the LTE neighbor cell has the CRS interference to the NR cell where the NR terminal is currently located according to the LTE neighbor cell CRS interference mitigation capability information of the NR terminal and the LTE neighbor cell information of the NR cell where the NR terminal is currently located.

In some embodiments, the LTE neighbor cell CRS interference mitigation capability information comprises at least one of:

whether the NR terminal supports the LTE neighbor cell CRS interference mitigation;

whether the NR terminal supports the blind detection-based LTE neighbor cell CRS interference mitigation;

when new radio subcarrier spacing is 30 k, whether the NR terminal supports the LTE neighbor cell CRS interference mitigation; or whether the NR terminal supports LTE neighbor cell CRS interference mitigation in an asynchronous system.

In some embodiments, a value of whether the NR terminal supports the LTE neighbor cell CRS interference mitigation represents whether the NR terminal supports the LTE neighbor cell CRS interference mitigation, the number of LTE neighbor cells supportable by the NR terminal for performing the LTE neighbor cell CRS interference mitigation, or the number of component carriers supportable by the NR terminal for simultaneously performing the LTE neighbor cell CRS interference mitigation in a carrier aggregation scenario.

In some embodiments, the enabling control information for the LTE neighbor cell CRS interference mitigation is sent through lte-CRS-ToMatchAround signaling or other RRC signaling than the lte-CRS-ToMatchAround signaling.

In some embodiments, the LTE neighbor cell CRS information comprises at least one of:

identification information, the number of CRS ports, MBSFN subframe configuration information, center frequency and system bandwidth, time slot number information, used cyclic prefix, or duplex mode, of the LTE neighbor cell having the CRS interference to the NR cell where the NR terminal is currently located, wherein if the duplex mode is TDD, the LTE neighbor cell CRS information further comprises uplink/downlink subframe allocation information.

In some embodiments, when the indication information comprises the LTE neighbor cell CRS information, the sending, by the NR base station to the NR terminal, the indication information related to the LTE neighbor cell CRS interference mitigation comprising:

the NR base station sending, to the NR terminal through the RRC signaling, a list containing one or more arrays, each array in the list indicating the CRS information of the LTE neighbor cell having the CRS interference to the NR cell where the NR terminal is currently located that is known by a network side, to indicate that the NR terminal turns on the CRS interference mitigation of the corresponding LTE neighbor cell;

or, the NR base station sending, to the NR terminal through the RRC signaling, release information of the whole list or partial arrays, to indicate that the NR terminal releases the list or the partial arrays in the list and turns off the CRS interference mitigation of the corresponding LTE neighbor cell.

Some embodiments of the present disclosure provide an NR base station, comprising: a memory; and a processor coupled to the memory, the processor being configured to perform, based on instructions stored in the memory, the method according to any of the embodiments.

Some embodiments of the present disclosure provide an NR terminal, comprising: a memory; and a processor coupled to the memory, the processor being configured to perform, based on instructions stored in the memory, the method according to any of the embodiments.

Some embodiments of the present disclosure provide a communication system, comprising: an NR base station; and an NR terminal.

Some embodiments of the present disclosure provide a non-transitory computer-readable storage medium stored a computer program which, when executed by a processor, implements the steps of the method according to any of the embodiments.

BRIEF DESCRIPTION OF THE DRAWINGS

The drawings that are required to be used in the description of the embodiments or the related art will be briefly described below. The present disclosure will be more clearly understood according to the following detailed description made with reference to the accompanying drawings.

It should be apparent that the drawings in the following description are merely some embodiments of the present disclosure and for those of ordinary skill in the art, they may obtain other drawings according to these drawings without paying out creative efforts.

DETAILED DESCRIPTION

The technical solutions in the embodiments of the present disclosure will be clearly and completely described below in conjunction with the drawings in the embodiments of the present disclosure.

According to embodiments of the present disclosure, an NR terminal reports, to an NR base station, LTE neighbor cell CRS interference mitigation capability information of the NR terminal, and the NR base station receives the LTE neighbor cell CRS interference mitigation capability information reported by the NR terminal, to assist the base station in making decisions accurately.

Figure 1:
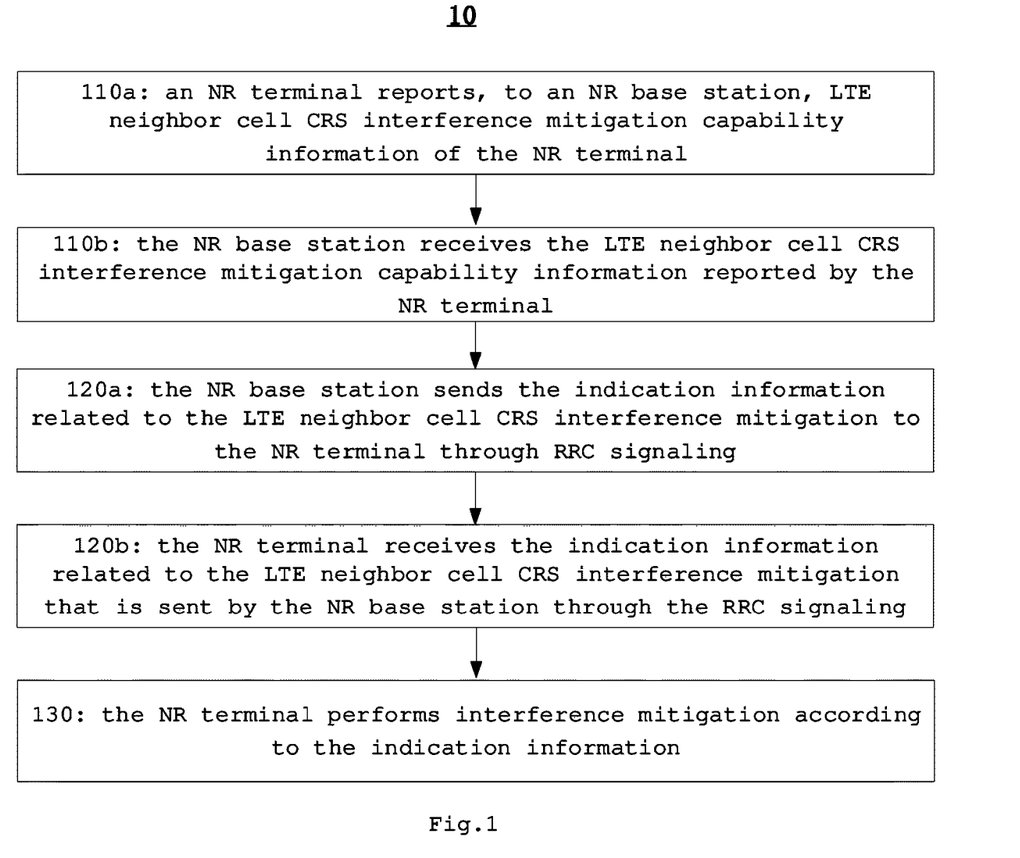
FIG. 1 illustrates a flow diagram of an interference mitigation method 10 according to some embodiments of the present disclosure.

FIG. 1 illustrates a flow diagram of an information transmission method according to some embodiments of the present disclosure.

As shown in FIG. 1, the information transmission method 10 of this embodiment comprises steps 110a to 110b; and may further comprise at least one of steps 120a, 120b, or 130 as needed.

In step 110a, an NR terminal reports, to an NR base station, LTE neighbor cell CRS interference mitigation capability information of the NR terminal.

The NR terminal performs channel quality detection (which does not comprise neighbor cell CRS interference if an LTE neighbor cell does not allocate downlink data transmission on an NR channel quality measurement reference signal) of a wireless channel, and simultaneously, the NR terminal reports the LTE neighbor cell CRS interference mitigation capability information of the NR terminal to the NR base station. Thus, the base station is assisted in accurately making decisions such as resource allocation and scheduling.

For example, the NR base station initiates a capability query to the NR terminal, and the NR terminal reports its own LTE neighbor cell CRS interference mitigation capability information to the NR base station.

Some examples of the LTE neighbor cell CRS interference mitigation capability information are presented below, but the disclosure is not limited to these examples.

In some embodiments, the LTE neighbor cell CRS interference mitigation capability information comprises, for example, at least one of:
  whether the NR terminal supports LTE neighbor cell CRS interference mitigation (denoted as capability 1);
  whether the NR terminal supports blind detection-based LTE neighbor cell CRS interference mitigation (denoted as capability 2);
  when new radio subcarrier spacing is 30 k, whether the NR terminal supports LTE neighbor cell CRS interference mitigation (denoted as capability 3); or
  whether the NR terminal supports LTE neighbor cell CRS interference mitigation in an asynchronous system (denoted as capability 4).

A network system has two implementations, namely an asynchronous system and a synchronous system, and in an actual network system, CRS interference mitigation of a synchronous network by the NR terminal might not be usable in an asynchronous network any more. After the NR terminal reports whether to support the LTE neighbor cell CRS interference mitigation in the asynchronous system, the base station judges whether the NR terminal supports the LTE neighbor cell CRS interference mitigation in the asynchronous network according to whether its own network belongs to the asynchronous network, and then selects whether to send indication information related to the LTE neighbor cell CRS interference mitigation to the NR terminal.

A value of whether the NR terminal supports the LTE neighbor cell CRS interference mitigation represents whether the NR terminal supports the LTE neighbor cell CRS interference mitigation, the number of LTE neighbor cells supportable by the NR terminal for performing the LTE neighbor cell CRS interference mitigation, or the number of component carriers supportable by NR terminal for simultaneously performing the LTE neighbor cell CRS interference mitigation in a carrier aggregation scenario.

The so-called blind detection-based LTE neighbor cell CRS interference mitigation refers to that, the NR terminal can perform LTE neighbor cell CRS interference detection and suppression without the need of sending LTE neighbor cell CRS information by the network side.

In step 110b, the NR base station receives the LTE neighbor cell CRS interference mitigation capability information reported by the NR terminal.

In step 120a, the NR base station sends the indication information related to the LTE neighbor cell CRS interference mitigation to the NR terminal through RRC (Radio Resource Control) signaling, wherein the indication information comprises at least one of enabling control information for the LTE neighbor cell CRS interference mitigation or the LTE neighbor cell CRS information.

The NR base station sends the indication information related to the LTE neighbor cell CRS interference mitigation to the NR terminal, according to the LTE neighbor cell CRS interference mitigation capability information of the NR terminal and LTE neighbor cell information of an NR cell where the NR terminal is currently located.

The enabling control information for the LTE neighbor cell CRS interference mitigation is an explicit indication of indicating that the NR terminal turns on or off the LTE neighbor cell CRS interference mitigation. The LTE neighbor cell CRS information, in addition to indicating the CRS information of the LTE neighbor cell to the NR terminal, also implicitly indicates that the NR terminal turns on the LTE neighbor cell CRS interference mitigation. That is, if the NR terminal receives the LTE neighbor cell CRS information issued by the NR base station, the NR terminal turns on the LTE neighbor cell CRS interference mitigation.

Some examples that the NR base station sends the indication information related to the LTE neighbor cell CRS interference mitigation to the NR terminal, according to the LTE neighbor cell CRS interference mitigation capability information of the NR terminal and the LTE neighbor cell information of the NR cell where the NR terminal is currently located are presented below, but the present disclosure is not limited to these examples.

In some embodiments, the NR base station sends, to the NR terminal, enabling control information for turning on the LTE neighbor cell CRS interference mitigation and/or the LTE neighbor cell CRS information when it is determined that the NR terminal supports the LTE neighbor cell CRS interference mitigation and the LTE neighbor cell has CRS interference to the NR cell where the NR terminal is currently located according to the LTE neighbor cell CRS interference mitigation capability information of the NR terminal and the LTE neighbor cell information of the NR cell where the NR terminal is currently located. That is, the NR base station may send, to the NR terminal, the enabling control information for turning on the LTE neighbor cell CRS interference mitigation, or the NR base station may send, to the NR terminal, the LTE neighbor cell CRS information, or the NR base station may simultaneously send, to the NR terminal, the enabling control information for turning on the LTE neighbor cell CRS interference mitigation and the LTE neighbor cell CRS information.

In some embodiments, after the NR terminal turns on the LTE neighbor cell CRS interference mitigation, the NR base station may further send enabling control information for turning off the LTE neighbor cell CRS interference mitigation to the NR terminal according to a control requirement and a control policy. For example, the NR base station sends the enabling control information for turning off the LTE neighbor cell CRS interference mitigation to the NR terminal according to the LTE neighbor cell CRS interference mitigation capability information of the NR terminal and the LTE neighbor cell information of the NR cell where the NR terminal is currently located.

In some embodiments, the NR base station sends, to the NR terminal, the enabling control information for turning off the LTE neighbor cell CRS interference mitigation when it is determined that the NR terminal supports the LTE neighbor cell CRS interference mitigation and the LTE neighbor cell has no CRS interference to the NR cell where the NR terminal is currently located according to the LTE neighbor cell CRS interference mitigation capability information of the NR terminal and the LTE neighbor cell information of the NR cell where the NR terminal is currently located.

In some embodiments, the NR base station sends, to the NR terminal, the enabling control information for turning on the LTE neighbor cell CRS interference mitigation and/or the LTE neighbor cell CRS information when it is determined that the NR terminal supports the blind detection-based LTE neighbor cell CRS interference mitigation and the LTE neighbor cell has the CRS interference to the NR cell where the NR terminal is currently located according to the LTE neighbor cell CRS interference mitigation capability information of the NR terminal and the LTE neighbor cell information of the NR cell where the NR terminal is currently located.

In some embodiments, the NR base station sends, to the NR terminal, the LTE neighbor cell CRS information when it is determined that the NR terminal supports the LTE neighbor cell CRS interference mitigation and does not support the blind detection-based LTE neighbor cell CRS interference mitigation and the LTE neighbor cell has the CRS interference to the NR cell where the NR terminal is currently located according to the LTE neighbor cell CRS interference mitigation capability information of the NR terminal and the LTE neighbor cell information of the NR cell where the NR terminal is currently located.

The enabling control information for the LTE neighbor cell CRS interference mitigations is sent through lte-CRS-ToMatchAround signaling or other RRC signaling than the lte-CRS-ToMatchAround signaling.

The indication mode of the indication information related to the LTE neighbor cell CRS interference mitigation of the LTE neighbor cell CRS information type comprises: the NR base station sending, to the NR terminal through RRC signaling, a list containing one or more arrays, each array in the list indicating the CRS information of the LTE neighbor cell having the CRS interference to the NR cell where the NR terminal is currently located that is known by a network side, to implicitly indicate that the NR terminal turns on the CRS interference mitigation of the corresponding LTE neighbor cell. The list includes N arrays at most, wherein N is a constant and its value may be preconfigured. The NR base station sends, to the NR terminal through the RRC signaling, release information of the whole list or partial arrays, to indicate that the NR terminal releases the list or the partial arrays in the list and turns off the CRS interference mitigation of the corresponding LTE neighbor cell.

The LTE neighbor cell CRS information comprises at least one of: the following information of the LTE neighbor cell having the CRS interference to the NR cell where the NR terminal is currently located: identification information (for example, physical ID of the LTE neighbor cell, or remainder of the physical ID of the LTE neighbor cell modulo 6 (i.e. v-Shift, relevant definition of which may be available by referring to TS 36.2116.10.1), the number of CRS ports (for example, 1 port/2 port/4 port), MBSFN (Multicast Broadcast Single Frequency Network) subframe configuration information, center frequency and system bandwidth (for example, the number of RBs (Resource Blocks)), time slot number information, used cyclic prefix (CP, for example, normal CP or extended CP), duplex mode (for example, FDD (Frequency Division Duplexing) or TDD (Time Division Duplexing)), wherein if the duplex mode is TDD, the LTE neighbor cell CRS information further comprises uplink/downlink subframe allocation information. If the number of CRS ports and the MBSFN subframe configuration information are not sent, at this time, the NR terminal should default that a relevant field configuration of the LTE neighbor cell CRS equates a CRS configuration of the LTE co-located with the cell.

An exemplary manner of the slot number information is: correspondence between a current NR cell time slot number $N_s$, $f$ and an LTE neighbor cell time slot number $N_s$, wherein the field is set as an integer k of 0-19, when the NR cell subcarrier spacing is 30 kHz, $N_s=(N_s, f+k) \%20$; and when the NR cell subcarrier spacing is 15 kHz, $N_s=(N_s, f\times2+k) \%20$, so that first 7 symbols of the time slot $N_s$ of the LTE at this time is aligned with first 7 symbols of the time slot $N_s$, $f$ of the NR in time domain. The form of the time slot number information is not limited to the presented example.

In step 120b, the NR terminal receives the indication information related to the LTE neighbor cell CRS interference mitigation that is sent by the NR base station through the RRC signaling.

In step 130, the NR terminal performs interference mitigation according to the indication information.

In some embodiments, if the indication information comprises the enabling control information for the LTE neighbor cell CRS interference mitigation, the NR terminal turns on or off the LTE neighbor cell CRS interference mitigation according to the enabling control information for the LTE neighbor cell CRS interference mitigation; and if the indication information comprises the LTE neighbor cell CRS information, the NR terminal turns on the LTE neighbor cell CRS interference mitigation according to the LTE neighbor cell CRS information and performs interference detection at a position corresponding to the LTE neighbor cell CRS information.

In some embodiments, the NR terminal may perform interference mitigation using a serial interference cancellation technique. Specifically, first, a signal with maximum intensity is detected from a received original signal by a pre-equalization detection algorithm, and it is judged whether the detected signal is a desired signal, if it is the desired signal, the detection is stopped, if it is not the desired signal, the signal serving as interference is subtracted from the original signal, and a next detection is stared, and so on until the desired signal is detected.

In the above embodiment, the NR terminal reports, to the NR base station, the LTE neighbor cell CRS interference mitigation capability information of the NR terminal, and the NR base station receives the LTE neighbor cell CRS interference mitigation capability information reported by the NR terminal, to assist the NR base station in accurately making decisions such as resource allocation and scheduling. The NR base station sends, to the NR terminal, the indication information related to the LTE neighbor cell CRS interference mitigation according to the LTE neighbor cell CRS interference mitigation capability information of the NR terminal and the LTE neighbor cell information of the NR cell where the NR terminal is currently located, so that the NR base station performs more targeted control for the LTE neighbor cell CRS interference mitigation by the NR terminal according to the capability of the NR terminal. At the same time, the NR terminal performs interference mitigation according to the indication information of the NR base station, which can assist the NR terminal in performing more targeted interference mitigation, to reduce some blind detection operations of the NR terminal and improve reliability of downlink data reception. For example, explicit or implicit enabling control for the LTE neighbor cell CRS interference mitigation avoids the NR terminal from performing futile CRS detection in a scenario of non-coexistence of NR and LTE, and saves energy consumption of the NR terminal. For another example, the sending of the LTE neighbor cell CRS information may assist an NR terminal not supporting blind detection in performing interference detection, and is helpful for an NR terminal supporting blind detection to reduce complexity of search and calculation.

Some application examples are presented below. It is assumed that in the scenario of coexistence of NR and LTE, a 5G system bandwidth of an NR cell is B1, a 4G system bandwidth of an LTE neighbor cell 1 is B2, and a 4G system bandwidth of an LTE neighbor cell 2 is B3, where a frequency domain overlapping part between B1 and B2 is B12, and a frequency domain overlapping part between B1 and B3 is B13. The above information is known on the 5G NR network side, and for a 5G NR terminal accessed to the service cell, an NR base station initiates a capability query to the NR terminal, and the NR terminal reports, to the NR base station, LTE neighbor cell CRS interference mitigation capability information, such as whether it supports the LTE neighbor cell CRS interference mitigation. Assuming that an NR terminal M reports supporting the capability 1 and the capability 2, assuming that a 5G NR and a 4G LTE coexist in the cell, the NR base station may, when configuring the NR terminal M, send lte-CRS-ToMatchAround signaling to indicate that the NR terminal performs rate matching on CRS time-frequency resources of the LTE in the cell, while implicitly indicating that the NR terminal blindly detects whether neighbor cell CRS interference exists and performs interference mitigation. Alternatively, the NR base station, through additional RRC signaling, implicitly indicates that the NR terminal blindly detects whether neighbor cell CRS interference exists and performs interference mitigation. In addition, the NR base station may directly send neighbor cell CRS configuration information to the NR terminal through RRC signaling, to indicate that the NR terminal M performs CRS interference detection and suppression at a corresponding position.

Figure 2:
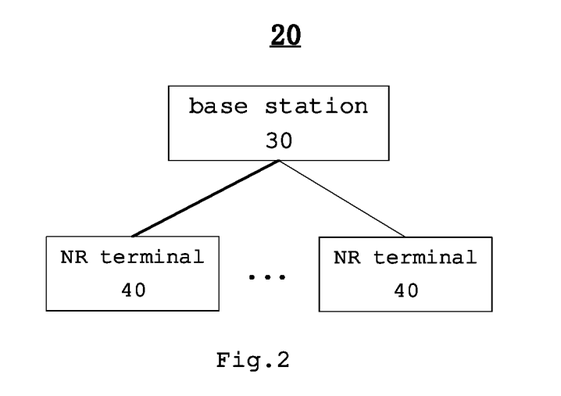
FIG. 2 illustrates a schematic diagram of a communication system 20 according to some embodiments of the present disclosure.

FIG. 2 illustrates a schematic diagram of a communication system 20 according to some embodiments of the present disclosure.

As shown in FIG. 2, the communication system 20 of this embodiment comprises: an NR base station 30 and one or more NR terminals 40.

Figure 3:
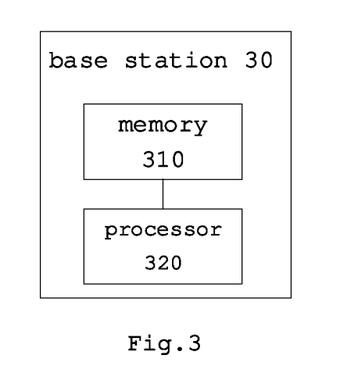
FIG. 3 illustrates a schematic diagram of a base station 30 according to some embodiments of the present disclosure.

FIG. 3 illustrates a schematic diagram of an NR base station 30 according to some embodiments of the present disclosure.

As shown in FIG. 3, the NR base station 30 of this embodiment comprises: a memory 310; and a processor 320 coupled to the memory 310, the processor 320 being configured to perform, based on instructions stored in the memory 310, the information transmission method performed by the NR base station in the foregoing embodiment.

For example, the NR base station receives LTE neighbor cell CRS interference mitigation capability information reported by an NR terminal.

For example, the NR base station sends indication information related to the LTE neighbor cell CRS interference mitigation to the NR terminal through RRC signaling, wherein the indication information comprises at least one of enabling control information for the LTE neighbor cell CRS interference mitigation or LTE neighbor cell CRS information.

For example, the NR base station sends, to the NR terminal, the indication information related to the LTE neighbor cell CRS interference mitigation, according to the LTE neighbor cell CRS interference mitigation capability information of the NR terminal and LTE neighbor cell information of an NR cell where the NR terminal is currently located.

Figure 4:
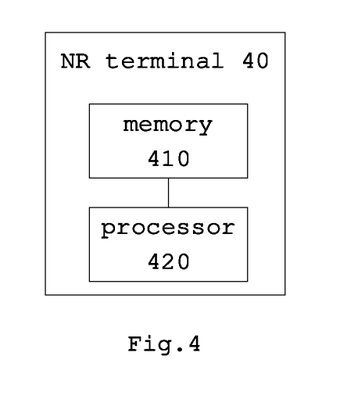
FIG. 4 illustrates a schematic diagram of a terminal 40 according to some embodiments of the present disclosure.

FIG. 4 illustrates a schematic diagram of an NR terminal 40 according to some embodiments of the present disclosure.

As shown in FIG. 4, the NR terminal 40 of this embodiment comprises: a memory 410; and a processor 420 coupled to the memory 410, the processor 420 being configured to perform, based on instructions stored in the memory 410, the information transmission method performed by the NR terminal in the foregoing embodiment.

For example, the NR terminal reports, to an NR base station, LTE neighbor cell CRS interference mitigation capability information of the NR terminal.

For example, the NR terminal receives indication information related to LTE neighbor cell CRS interference mitigation that is sent by the NR base station through RRC signaling, wherein the indication information comprises at least one of enabling control information for the LTE neighbor cell CRS interference mitigation or LTE neighbor cell CRS information.

For example, the NR terminal performs interference mitigation according to the indication information. If the indication information comprises the enabling control information for the LTE neighbor cell CRS interference mitigation, the NR terminal turns on or off the LTE neighbor cell CRS interference mitigation according to the enabling control information for the LTE neighbor cell CRS interference mitigation. If the indication information comprises the LTE neighbor cell CRS information, the NR terminal turns on the LTE neighbor cell CRS interference mitigation according to the LTE neighbor cell CRS information and performs interference detection at a position corresponding to the LTE neighbor cell CRS information.

The memories 310, 410 may include, for example, a system memory, a fixed non-volatile storage medium, and the like. The system memory has thereon stored, for example, an operating system, an application, a boot loader, other programs, and the like.

Some embodiments of the present disclosure provide a non-transitory computer-readable storage medium having thereon stored a computer program which, when executed by a processor, implements the steps of the information transmission method in the foregoing embodiment.

It should be appreciated by those skilled in the art that, the embodiments of the present disclosure may be provided as a method, system, or computer program product. Accordingly, the present disclosure may take a form of an entire hardware embodiment, an entire software embodiment, or an embodiment combining software and hardware aspects. Furthermore, the present disclosure may take a form of a computer program product implemented on one or more non-transitory computer-readable storage media (including, but not limited to, a disk memory, CD-ROM, optical memory, etc.) having computer program code embodied therein.

The present disclosure is described with reference to flow diagrams and/or block diagrams of the method, apparatus (system) and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions may be provided to a processor of a general-purpose computer, special-purpose computer, embedded processor, or other programmable data processing devices to produce a machine, such that the instructions which are executed through the processor of the computer or other programmable data processing devices create means for implementing the functions specified in one or more flows of the flow diagrams and/or one or more blocks of the block diagrams.

These computer program instructions may also be stored in a computer-readable memory that can guide a computer or other programmable data processing devices to work in a specific manner, such that the instructions stored in the computer-readable memory produce an article of manufacture including instruction means which implement the functions specified in one or more flows of the flow diagrams and/or one or more blocks of the block diagrams.

These computer program instructions may also be loaded onto a computer or other programmable data processing devices to cause a series of operational steps to be performed on the computer or other programmable devices to produce a computer-implemented process, such that the instructions which are executed on the computer or other programmable devices provide steps for implementing the functions specified in one or more flows of the flow diagrams and/or one or more blocks of the block diagrams.

The above content are only the preferred embodiments of the present disclosure and not used for limiting the present disclosure, and any modifications, equivalent substitutions, improvements, etc. made within the spirit and principles of the present disclosure should be included within the scope of protection of the present disclosure.

What is claimed is:

1. An information transmission method, comprising:
reporting, by a New Radio (NR) terminal to an NR base station, Long Term Evolution (LTE) neighbor cell Cell Reference Signal (CRS) interference mitigation capability information of the NR terminal,
wherein the LTE neighbor cell CRS interference mitigation capability information comprises at least one of:
whether the NR terminal supports LTE neighbor cell CRS interference mitigation without LTE neighbor cell CRS information from a network; or
when New radio subcarrier spacing is 30 kHz, whether the NR terminal supports the LTE neighbor cell CRS interference mitigation.

2. The information transmission method according to claim 1, further comprising:
receiving, by the NR terminal, indication information related to LTE neighbor cell CRS interference mitigation that is sent by the NR base station through Radio Resource Control (RRC) signaling, wherein the indication information comprises at least one of enabling control information for the LTE neighbor cell CRS interference mitigation or the LTE neighbor cell CRS information.

3. The information transmission method according to claim 2, further comprising:
performing, by the NR terminal, interference mitigation according to the indication information.

4. The information transmission method according to claim 3, wherein the performing, by the NR terminal, interference mitigation according to the indication information comprises:
the NR terminal turning on or off the LTE neighbor cell CRS interference mitigation according to the enabling control information for the LTE neighbor cell CRS interference mitigation in a case where the indication information comprises the enabling control information for the LTE neighbor cell CRS interference mitigation; or
the NR terminal turning on the LTE neighbor cell CRS interference mitigation according to the LTE neighbor cell CRS information and performing interference detection at a position corresponding to the LTE neighbor cell CRS information in a case where the indication information comprises the LTE neighbor cell CRS information.

5. The information transmission method according to claim 2, wherein the enabling control information for the LTE neighbor cell CRS interference mitigation is sent through lte-CRS-ToMatchAround signaling or other RRC signaling than the lte-CRS-ToMatchAround signaling.

6. The information transmission method according to claim 2, wherein the LTE neighbor cell CRS information comprises at least one of:
identification information, the number of CRS ports, MBSFN subframe configuration information, center frequency and system bandwidth, time slot number information, used cyclic prefix, or duplex mode, of an LTE neighbor cell having CRS interference with the NR cell where the NR terminal is currently located,
wherein if the duplex mode is TDD, the LTE neighbor cell CRS information further comprises uplink/downlink subframe allocation information.

7. The information transmission method according to claim 2, wherein when the indication information comprises the LTE neighbor cell CRS information, the sending, by the NR base station to the NR terminal, the indication information related to the LTE neighbor cell CRS interference mitigation comprises:
the NR base station sending, to the NR terminal through the RRC signaling, a list containing one or more arrays, each array in the list indicating CRS information of a respective LTE neighbor cell having CRS interference with the NR cell where the NR terminal is currently located that is known by a network side, to indicate that the NR terminal turns on CRS interference mitigation of the respective LTE neighbor cell; or the NR base station sending, to the NR terminal through the RRC signaling, release information of the whole list or partial arrays, to indicate that the NR terminal releases the list or the partial arrays in the list and turns off CRS interference mitigation of the respective LTE neighbor cell.

8. The information transmission method according to claim 1, wherein the LTE neighbor cell CRS interference mitigation capability information comprises at least one of:

whether the NR terminal supports the LTE neighbor cell CRS interference mitigation; or whether the NR terminal supports LTE neighbor cell CRS interference mitigation in an asynchronous system.

9. The information transmission method according to claim 1, wherein the LTE neighbor cell CRS interference mitigation capability information further comprises a value indicating whether the NR terminal supports the LTE neighbor cell CRS interference mitigation, the number of LTE neighbor cells supportable by the NR terminal for performing the LTE neighbor cell CRS interference mitigation, or the number of component carriers supportable by the NR terminal for simultaneously performing the LTE neighbor cell CRS interference mitigation in a carrier aggregation scenario.

10. An information transmission method, comprising:

receiving, by an NR base station, LTE neighbor cell CRS interference mitigation capability information reported by an NR terminal, wherein the LTE neighbor cell CRS interference mitigation capability information comprises at least one of:

whether the NR terminal supports LTE neighbor cell CRS interference mitigation without LTE neighbor cell CRS information from a network; or when New radio subcarrier spacing is 30 kHz, whether the NR terminal supports the LTE neighbor cell CRS interference mitigation.

11. The information transmission method according to claim 10, further comprising:

sending, by the NR base station, indication information related to LTE neighbor cell CRS interference mitigation to the NR terminal through RRC signaling, wherein the indication information comprises at least one of enabling control information for the LTE neighbor cell CRS interference mitigation or the LTE neighbor cell CRS information.

12. The information transmission method according to claim 11, wherein the NR base station sends, to the NR terminal, the indication information related to the LTE neighbor cell CRS interference mitigation, according to the LTE neighbor cell CRS interference mitigation capability information of the NR terminal and LTE neighbor cell information of an NR cell where the NR terminal is currently located.

13. The information transmission method according to claim 12, wherein the sending, by the NR base station to the NR terminal, the indication information related to the LTE neighbor cell CRS interference mitigation, according to the LTE neighbor cell CRS interference mitigation capability information of the NR terminal and LTE neighbor cell information of an NR cell where the NR terminal is currently located comprises:

the NR base station sending, to the NR terminal, enabling control information for turning on the LTE neighbor cell CRS interference mitigation and/or the LTE neighbor cell CRS information according to the LTE neighbor cell CRS interference mitigation capability information of the NR terminal and the LTE neighbor cell information of the NR cell where the NR terminal is currently located, when the NR terminal is determined to supports the LTE neighbor cell CRS interference mitigation, and the LTE neighbor cell has CRS interference with the NR cell where the NR terminal is currently located; or the NR base station sending, to the NR terminal, enabling control information for turning off the LTE neighbor cell CRS interference mitigation according to the LTE neighbor cell CRS interference mitigation capability information of the NR terminal and the LTE neighbor cell information of the NR cell where the NR terminal is currently located; or the NR base station sending, to the NR terminal, the enabling control information for turning off the LTE neighbor cell CRS interference mitigation according to the LTE neighbor cell CRS interference mitigation capability information of the NR terminal and the LTE neighbor cell information of the NR cell where the NR terminal is currently located, when the NR terminal is determined to support the LTE neighbor cell CRS interference mitigation and the LTE neighbor cell has no CRS interference with the NR cell where the NR terminal is currently located; or the NR base station sending, to the NR terminal, the enabling control information for turning on the LTE neighbor cell CRS interference mitigation and/or the LTE neighbor cell CRS information according to the LTE neighbor cell CRS interference mitigation capability information of the NR terminal and the LTE neighbor cell information of the NR cell where the NR terminal is currently located, when the NR terminal is determined to supports blind detection-based LTE neighbor cell CRS interference mitigation and the LTE neighbor cell has the CRS interference with the NR cell where the NR terminal is currently located; or the NR base station sending, to the NR terminal, the LTE neighbor cell CRS information according to the LTE neighbor cell CRS interference mitigation capability information of the NR terminal and the LTE neighbor cell information of the NR cell where the NR terminal is currently located, when it is determined that the NR terminal is determined to support the LTE neighbor cell CRS interference mitigation and does not support blind detection-based LTE neighbor cell CRS interference mitigation and the LTE neighbor cell has the CRS interference with the NR cell where the NR terminal is currently located.

14. An NR base station, comprising:

a memory; and a processor coupled to the memory, the processor being configured to perform, based on instructions stored in the memory, the information transmission method according to claim 10.

15. The NR base station according to claim 14, wherein the processor is configured to send indication information related to LTE neighbor cell CRS interference mitigation to the NR terminal through RRC signaling, wherein the indication information comprises one or more of enabling control information for the LTE neighbor cell CRS interference mitigation or LTE neighbor cell CRS information.

16. An NR terminal, comprising:

a memory; and a processor coupled to the memory, the processor being configured to perform, based on instructions stored in the memory, the information transmission method according to claim 1.

17. The NR terminal according to claim 16, wherein the processor is configured to receive, indication information related to LTE neighbor cell CRS interference mitigation that is sent by the NR base station through Radio Resource Control RRC signaling, wherein the indication information comprises one or more of enabling control information for the LTE neighbor cell CRS interference mitigation or LTE neighbor cell CRS information; and perform interference mitigation according to the indication information.

18. A communication system, comprising:

an NR terminal configured to report, to an NR base station, Long Term Evolution (LTE) neighbor cell Cell Reference Signal (CRS) interference mitigation capability information of the NR terminal; and the NR base station configured to receive the LTE neighbor cell CRS interference mitigation capability information reported by the NR terminal, wherein the LTE neighbor cell CRS interference mitigation capability information comprises at least one of:

whether the NR terminal supports LTE neighbor cell CRS interference mitigation without LTE neighbor cell CRS information from a network; or when New radio subcarrier spacing is 30 kHz, whether the NR terminal supports the LTE neighbor cell CRS interference mitigation.

19. A non-transitory computer-readable storage medium storing a computer program which, when executed by a processor, implements the steps of the information transmission method according to claim 1.

20. The non-transitory computer-readable storage medium according to claim 19, wherein the computer program implements the step of receiving LTE neighbor cell CRS interference mitigation capability information reported by an NR terminal.

\* \* \* \* \*